Dec. 31, 1968 R. S. HARTZ ET AL 3,419,751
PROTECTION FOR HORIZONTAL DEFLECTION CIRCUITS
Filed Aug. 11, 1966
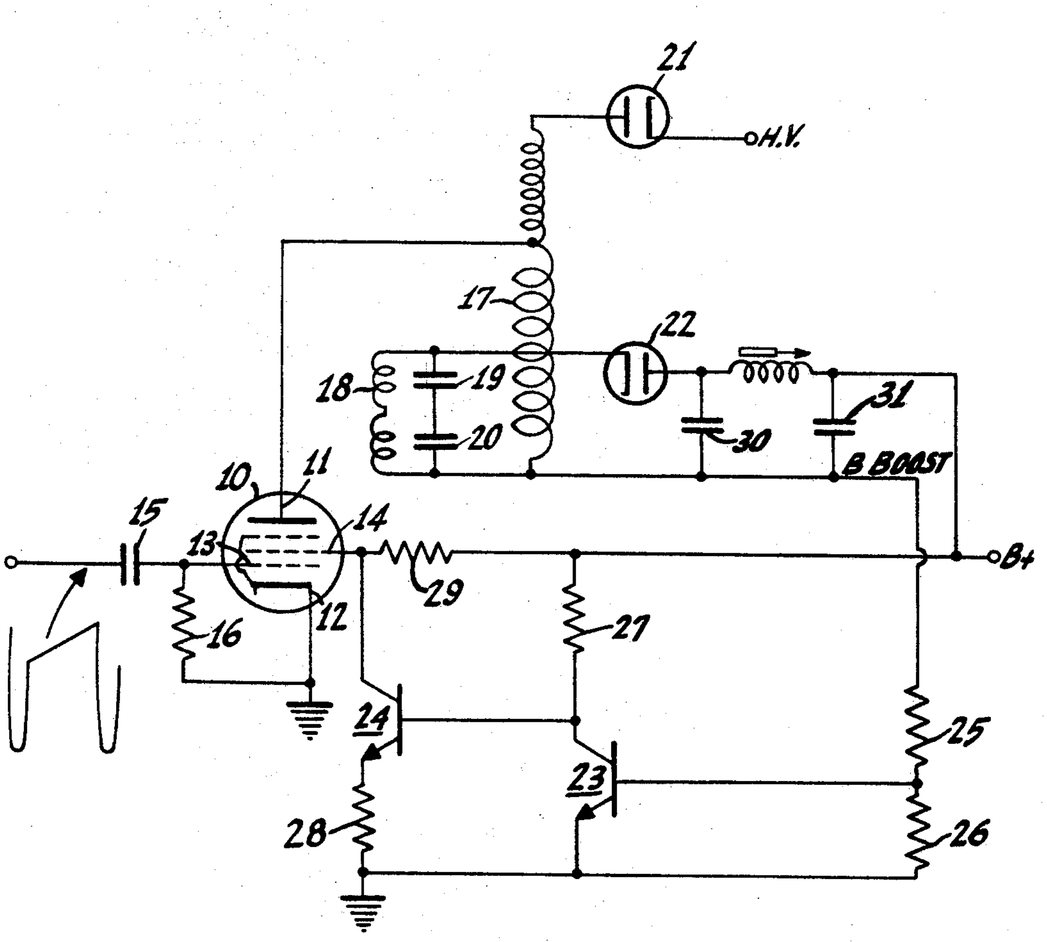
Inventors:
RALPH S. HARTZ &
WILLIAM S. CRANMER
BY Eugene M. Whitacre
Attorney United States Patent Office 3,419,751

Patented Dec. 31, 1968

3,419,751

PROTECTION FOR HORIZONTAL DEFLECTION CIRCUITS

Ralph S. Hartz, Hazlet, and William S. Cranmer, Somerville, N.J., assignors to Radio Corporation of America, a corporation of Delaware Filed Aug. 11, 1966, Ser. No. 571,853
6 Claims. (Cl. 315—27)

ABSTRACT OF THE DISCLOSURE

A television horizontal deflection circuit is provided with a protection circuit which derives a control voltage indicative of normal and abnormal deflection wave currents. A control amplifier responsive to a voltage indicative of abnormal deflection currents acts on the horizontal output tube to prevent excessive output tube current.

This invention relates to television horizontal deflection circuits and in particular to a protection for components of horizontal deflection circuits in the event of overload or loss of drive signal.

In a color television receiver it is desirable to provide a bright image with full color rendition. In general color television picture tubes are lower in efficiency for generation of light than are black-white tubes. For an equivalent brightness the color picture tube requires more high voltage power than the black and white tube. It is the practice to derive this power from the horizontal deflection circuit. This necessitates a high power deflection circuit including expensive tubes and transformers. Maximum utilization of the power rating of tubes and transformer is then desirable but leaves little reserve to withstand overload.

It is an object of this invention to provide a deflection high voltage supply circuit which is protected from excess loads or electrical arcs.

It is a further object of this invention to provide a horizontal deflection circuit which is protected against overload conditions resulting from loss of signal drive.

A circuit embodying the invention includes means for deriving a control voltage indicative of normal and abnormal deflection wave currents. This control voltage is applied to an amplifier which controls the second control electrode voltage of the horizontal output tube. For normal deflection wave currents a range of control voltage is applied to the amplifier which provides normal second control electrode voltage to the drive tube. However for abnormal deflection wave currents less than the normal currents, a range of control voltage is applied to the amplifier to cause a decrease in the voltage supplied to the second control electrode of the drive tube. This decrease in second control electrode voltage prevents excessive plate dissipation which may cause destruction of the horizontal output tube, or destruction of the horizontal output transformer due to excessive tube current.

It is a feature of this invention that the control voltage amplifier provides gain to effect a rapid transition from the normal ot the abnormal range of operation.

A further feature of this invention is that the low second control electrode voltage in response to abnormal deflection wave current conditions is automatically restored to normal values when the abnormal load is removed. This combination of rapid transition and automatic recovery makes this deflection circuit self-protecting against momentary high voltage arcs.

Another feature of this invention is that in the control voltage range indicative of normal deflection currents, the amplifier is operated in saturation to reduce its gain.

The control feedback which is of a positive feedback polarity is therefore ineffectual, in altering the normal operation of the deflection circuit. The standard use of negative control feedback on the horizontal deflection high voltage supply to provide constant width and good power supply regulation is therefore unaffected.

Other advantages and features of this invention will be best understood by reference to the accompanying specification when read in conjunction with the drawing, the sole figure of which is a schematic circuit diagram of a horizontal deflection output circuit embodying the invention.

The horizontal deflection circuit shown in the drawing includes a beam power type output tube 10 including an anode 11, cathode 12, control electrode 13 and screen electrode 14. Horizontal drive signals from a suitable source, not shown, are coupled by way of a capacitor 15 and resistor 16 to the control electrode 13.

The anode 11 of the output tube 10 is coupled to a tap on a horizontal output transformer 17, which in the present instance is shown as an autotransformer. A deflection yoke 18 which in practice is mounted about the neck of a picture tube used in the television receiver, receives a sawtooth scanning current wave which causes the electron beam of the picture tube to be deflected in a horizontal direction. At the end of each scanning interval the drive signals cause the current from the output tube 10 to be interrupted at which time the retrace interval begins. During the retrace interval the yoke 18 and the series capacitors 19 and 20 oscillate resulting in a flyback pulse appearing across the transformer 17. This pulse is rectified by a diode 21 to provide high voltage H.V. for the ultor of the picture tube.

When the polarity of the oscillating voltage across the yoke 18 and capacitors 19 and 20 reverse, a damper diode 22 conducts causing the remaining stored energy in the yoke to be transfered to B-boost capacitors 30 and 31. The voltage thus developed across the B-boost capacitors 30 and 31 is proportional to the stored yoke energy and therefore to the magnitude of the deflection wave current passing through the yoke 18. This B-boost voltage is added to the normal supply B+ to be available during the latter portion of the scan interval when drive tube 10 again conducts to supply deflection current to the transformer 17.

During normal operation of the deflection circuit the deflection wave currents and consequently the resultant B-boost voltage will be in a first range of magnitudes. Under abnormal operating conditions, which may result in the destruction of the horizontal output tube 10 or the horizontal output transformer 17, the deflection wave currents and the resultant B-boost voltage will be in a second lower range of magnitudes. One factor which may produce such an abnormal operating condition is an overload in the high voltage circuit, such as arcing within the picture tube between the ultor electrode and the electron gun structure. An overload condition of the high voltage circuit in turn loads the horizontal output transformer 17 absorbing energy from the transformer 17 and yoke 18. This results in smaller amplitude deflection wave currents and less B-boost voltage being developed when the damper 22 conducts. The increased load (reduced impedance) presented to the horizontal output tube 10 causes higher current to flow for longer periods of time resulting in increased average anode 11 current which can cause destruction of the tube or output transformer.

Another factor which can cause an abnormal operating condition is reduced drive signal level applied between the control electrode 13 and the cathode 12. With reduced drive signal the deflection wave current in the transformer 17 and yoke 18 is reduced, with a consequent reduction in B-boost voltage. However, the reduced signal drive also causes less negative bias voltage to be developed at the control electrode 13 of the tube 10. As a result, the average current drawn by the anode 11 is increased with a concomitant increase in dissipation which may be sufficient to destroy the output tube 10 or transformer 17.

To protect the output tube 10 and transformer 17 against damage caused by such overload conditions as described above, a pair of transistors 23 and 24 are connected to control the screen electrode 14 voltage of the tube 10. A voltage divider including a pair of resistors 25 and 26 are connected from the B-boost voltage terminal to a point of reference potential shown as ground. The base electrode of the transistor 23 is connected to the junction of the resistors 25 and 26. A collector load resistor 27 is connected from the collector of transistor 23 to the operating potential supply terminal B+, and the emitter electrode thereof is grounded. The voltage developed at the collector electrode of transistor 23 is applied to the base electrode of transistor 24, the collector electrode of which is connected to the screen electrode 14 of the output tube 10. The emitter electrode of transistor 24 is returned to ground through a resistor 28.

Under normal operating conditions the transistor 23 is conducting and the transistor 24 is cut-off, so that the screen electrode 14 voltage is of a relatively high value as determined by the resistor 29. The voltage divider 25–26 samples the B-boost voltage so that when the B-boost voltage is of a normal relatively high magnitude the transistor 23 is in saturation. The saturation of the transistor 23 prevents variations of the B-boost voltage, when it is in a range of magnitudes representing normal operating conditions, from being fed back to the screen electrode 14 of drive tube 10 and thus the high voltage regulation or width regulation designed into the horizontal flyback deflection circuit is not affected by this feedback connection.

In the abnormal range of reduced deflection wave currents B-boost voltage drops to a lower value whereby the voltage applied to the base electrode of transistor 23 becomes less positive, causing the voltage at the collector electrode to become more positive. The increased positive voltage at the collector electrode of transistor 23 is applied to the base electrode of the transistor 24 driving this transistor into conduction. Transistor 24 conduction reduces the voltage applied to the screen of the output tube 10. This is a positive feedback relationship since the reduction in screen voltage reduces deflection wave currents and further reduces B-boost voltage. This sequence of events proceeds until transistor 23 is cut-off or reduced to very low conduction by low drive from the voltage divider resistors 25 and 26. Under these conditions the transistor 24 is highly conductive and reduces the screen electrode 14 voltage on drive tube 10 to approximately 10 volts. With reduced screen electrode 14 voltage the output tube 10 current is reduced causing the B-boost voltage to fall to approximately the B+ supply potential. With drive signals applied to the output tube 10 a small deflection wave current will continue to flow in the yoke 18. When the fault or abnormal operating condition is removed the B-boost voltage increases causing the screen electrode 14 voltage to increase. At some level of B-boost voltage greater than that which caused the screen voltage to be reduced, the screen electrode voltage will be restored. In other words, the screen electrode voltage versus B-boost voltage characteristic defines a hysteresis loop wherein the first range of B-boost voltages characteristic of normal circuit operation overlaps to some extent the second range of B-boost voltages indicative of abnormal circuit operation.

The deflection circuit can be characterized as being in a stable state when the output tube 10 is in normal conduction; the transistor 23 being in saturation; and the transistor 24 being cut-off. For abnormal conditions the circuit can be characterized as being in an astable state with the transistor 24 being conductive and the transistor 23 being cut-off or nearly cut-off. The circuit will remain in the astable state as long as the overload or absence of drive signals persists. The removal of the overload or the return of drive signals to output tube 10 causes the circuit to revert to its stable condition in which case the deflection wave current will build up to the normal range of values. In this way, normal operation deflection currents will build up automatically when the receiver is first turned on, or if a fault has been rectified.

What is claimed is:

1. A horizontal deflection circuit for television receivers comprising in combination:
   - a deflection output tube having a cathode, anode and first and second control electrodes;
   - an input circuit coupled between said first control electrode and said cathode for providing deflection drive signals;
   - an output circuit including a deflection yoke coupled between said anode and said cathode for causing a suitable deflection wave current to pass through said deflection yoke;
   - means coupled to said output circuit for deriving a control voltage having a first range of magnitudes indicative of normal deflection wave currents and a second range of magnitudes indicative of abnormal deflection wave currents lower in amplitude than said normal deflection wave currents;
   - an operating potential supply;
   - an operating potential supply circuit connected between said second electrode and said cathode including said operating potential supply and an amplifier device having a control electrode;
   - means for applying said control voltage to said control electrode to change the conductivity of said amplifier device so that the operating potential applied to said second electrode is reduced in response to control voltages in said second range of magnitudes and is increased in response to control voltages in said first range of magnitudes.

2. A horizontal deflection circuit as defined in claim 1 wherein the operating potential applied to said second electrode in response to control voltages in said second range of magnitudes is of a first relatively low amplitude and the operating potential applied to said second electrode in response to control voltages in said first range of magnitudes is of a second relatively high amplitude, and wherein the second electrode operating potential as a function of control voltages between said first and second range of magnitudes defines a hysteresis loop such that said first and second ranges of control voltage magnitudes overlap.

3. A horizontal deflection circuit as defined in claim 2 wherein said amplifier device included in said operating potential supply circuit operates in saturation and is characterized by reduced gain for said first range of magnitudes of control voltage as applied to the amplifier control electrode.

4. A horizontal deflection circuit as defined in claim 1 wherein said output circuit includes:
   - means for developing a B-boost voltage, and wherein said means coupled to said output circuit for deriving a control voltage is coupled to receive said B-boost voltage.

5. A horizontal deflection circuit as defined in claim 1 wherein the operating potential supply circuit connected to said second electrode includes a voltage dropping resistor connected between the operating potential supply and the second control electrode; and wherein said amplifier device has a pair of output electrodes connected respectively to said second control electrode and the cathode of the output tube.

6. In a horizontal deflection circuit of the type including a multiple electrode output tube having a screen electrode, a pair of operating potential supply terminals and a B-boost voltage terminal, the combination of:

first and second transistors each having base, emitter and collector electrodes;

a resistor connected between said screen electrode and said operating potential supply terminal;

means connecting the collector electrode of said first transistor to said screen electrode;

means connecting the emitter electrode of said first transistor to the other of said potential supply terminals;

means connecting the collector electrode of said second transistor to the base electrode of said first transistor;

means connecting the collector and emitter electrodes of said second transistor to respective ones of said operating potential supply terminals; and means coupling the base electrode of said second transistor to said B-boost voltage terminal.

References Cited

UNITED STATES PATENTS 2,888,607 5/1959 Hooper ............ 315—27

RODNEY D. BENNETT, *Primary Examiner.*

CHARLES L. WAITHAM, *Assistant Examiner.*